US011619565B2

(12) United States Patent
Pfister et al.

(10) Patent No.: US 11,619,565 B2
(45) Date of Patent: Apr. 4, 2023

(54) METHOD FOR CONTROLLING, MORE PARTICULARLY IN A CLOSED-LOOP MANNER, A POWERTRAIN TEST BENCH WITH REAL TRANSMISSION

(71) Applicant: AVL LIST GMBH, Graz (AT)

(72) Inventors: Felix Pfister, Graz (AT); Andreas Fleck, Maria Enzersdorf (AT)

(73) Assignee: AVL LIST GMBH, Graz (AT)

( * ) Notice: Subject to any disclaimer, the term of this patent is extended or adjusted under 35 U.S.C. 154(b) by 211 days.

(21) Appl. No.: 16/603,373

(22) PCT Filed: Apr. 6, 2018

(86) PCT No.: PCT/EP2018/058860
§ 371 (c)(1),
(2) Date: Feb. 16, 2021

(87) PCT Pub. No.: WO2018/185286
PCT Pub. Date: Oct. 11, 2018

(65) Prior Publication Data
US 2021/0231527 A1    Jul. 29, 2021

(30) Foreign Application Priority Data

Apr. 7, 2017   (AT) ............................ A 50291/2017

(51) Int. Cl.
*G01M 13/026*    (2019.01)
*G01M 13/022*    (2019.01)

(52) U.S. Cl.
CPC ........ *G01M 13/026* (2013.01); *G01M 13/022* (2013.01)

(58) Field of Classification Search
CPC .. G01M 13/026; G01M 13/022; G01M 13/02; G01M 13/021; G01M 13/025
See application file for complete search history.

(56) References Cited

U.S. PATENT DOCUMENTS 10,502,661 B2 * 12/2019 Pfister ............... G01M 17/0074
10,677,687 B2 *  6/2020 Pfister ............... G01M 17/0074
(Continued)

FOREIGN PATENT DOCUMENTS

| AT | 508031 | 10/2010 |
| AT | 512483 | 8/2013 |

(Continued)

OTHER PUBLICATIONS

International Search Report for International (PCT) Patent Application No. PCT/EP2018/058860, dated Jun. 28, 2018, 3 pages.
(Continued)

*Primary Examiner* — Freddie Kirkland, III
(74) *Attorney, Agent, or Firm* — Sheridan Ross PC

(57) ABSTRACT

The invention relates to a method for controlling, more particularly in a closed-loop manner, a test bench for a powertrain with a real transmission, the method including calculating a desired value of a control parameter, more particularly a desired rotational speed, at the transmission output of the real transmission by means of a model that represents the transmission and at least one further component, more particularly a shaft, of the output side of the powertrain as virtual components, on the basis of at least one measurement parameter, more particularly a rotational speed and/or a torque, measured on the powertrain; and controlling the test bench, more particularly a load machine, on the basis of the desired value.

17 Claims, 2 Drawing Sheets

(56) References Cited

U.S. PATENT DOCUMENTS

Figure 1:
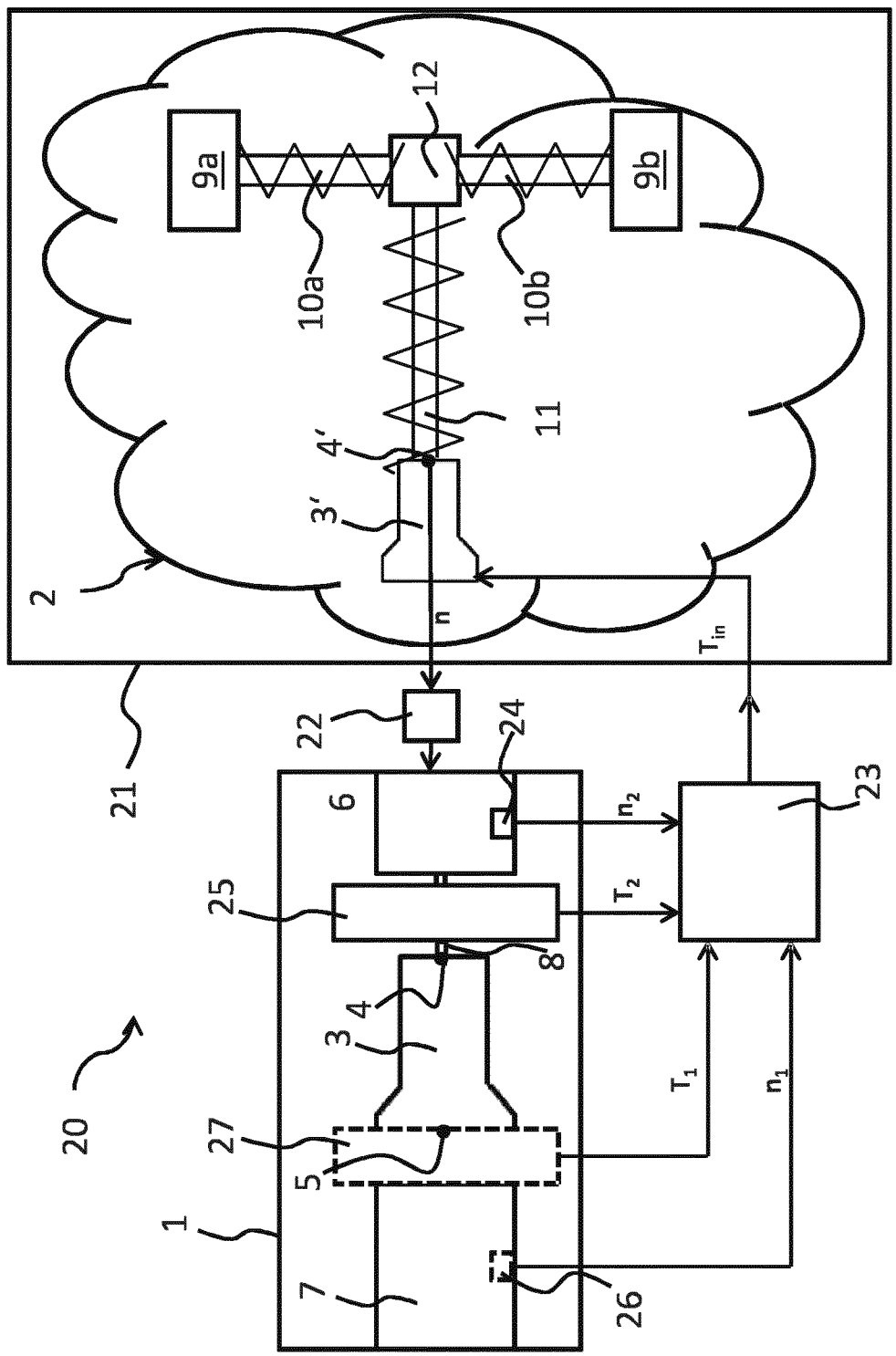

| | | | |
|---|---|---|---|
| 11,085,851 B2* | 8/2021 | Akiyama | G01M 13/022 |
| 2003/0167143 A1* | 9/2003 | Turbett | G06F 30/15 |
| | | | 702/113 |
| 2016/0116367 A1* | 4/2016 | Pfister | G01M 13/02 |
| | | | 73/664 |
| 2016/0171133 A1* | 6/2016 | Pfister | G01M 15/02 |
| | | | 703/8 |
| 2016/0327451 A1 | 11/2016 | Bauer et al. | |
| 2017/0261392 A1* | 9/2017 | Pfister | F02D 35/023 |
| 2017/0336289 A1* | 11/2017 | Pfister | G01M 13/025 |
| 2018/0143101 A1* | 5/2018 | Pfister | G01M 17/0074 |
| 2019/0310162 A1* | 10/2019 | Pfeiffer | G01M 13/025 |

FOREIGN PATENT DOCUMENTS

| | | |
|---|---|---|
| AT | 514725 | 3/2015 |
| DE | 102007016420 | 10/2008 |
| EP | 2161560 | 3/2010 |
| JP | 2010-223861 | 10/2010 |
| JP | 2014-174103 | 9/2014 |
| JP | 2016-001174 | 1/2016 |
| WO | WO 2011/022746 | 3/2011 |
| WO | WO 2011/038429 | 4/2011 |
| WO | WO 2016/012575 | 1/2016 |
| WO | WO 2016/083566 | 6/2016 |
| WO | WO 2016/102555 | 6/2016 |

OTHER PUBLICATIONS

Official Action for Austria Patent Application No. A 50291/2017, dated Feb. 13, 2018, 4 pages.
Decision to Grant for Austria Patent Application No. A 50291/2017, dated Apr. 19, 2018, 3 pages.
Official Action with English Translation for Japan Patent Application No. 2019-554759, dated Mar. 22, 2022, 9 pages.
Official Action with English Translation for Japan Patent Application No. 2019-554759, dated Nov. 7, 2022, 6 pages.

* cited by examiner

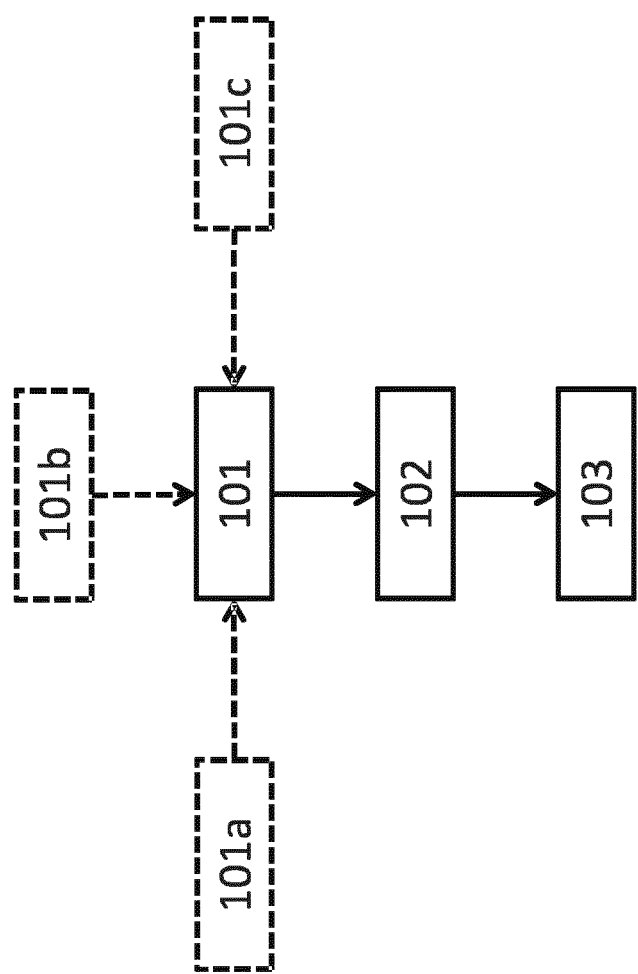

METHOD FOR CONTROLLING, MORE PARTICULARLY IN A CLOSED-LOOP MANNER, A POWERTRAIN TEST BENCH WITH REAL TRANSMISSION

CROSS REFERENCE TO RELATED APPLICATIONS

This application is a national stage application under 35 U.S.C. 371 and claims the benefit of PCT Application No. PCT/EP2018/058860 having an international filing date of 6 Apr. 2018, which designated the United States, which PCT application claimed the benefit of Austria Patent Application No. A50291/2017 filed 7 Apr. 2017, the disclosures of each of which are incorporated herein by reference in their entireties.

The invention relates to a method for controlling, particularly in a closed-loop manner, a test bench for a powertrain having a real transmission.

At least individual components of the powertrain of a motor vehicle can be tested on vehicle test benches or powertrain test benches. Depending on which component or components are tested, a roller test bench, an engine test bench, a transmission test bench, etc., is thereby used.

A test object, thus the apparatus to be tested, is thereby subjected to a test run in order to check the properties of the test object. To achieve this, specific measured variables are determined by suitable measuring sensors during a test run and evaluated in real time or after a delay (post-mortem).

The test object is thereby generally a combination of a number of real components and a number of virtual components, whereby the real components are assembled on the test bench as actual structural components and the virtual components are simulated by simulation models, particularly in real time, and thereby supplementarily complete the real components into an overall system. The test object can thus be advantageously divided into a real test object (Real Unit Under Test—rUUT), which comprises the actual components, and a virtual test object (Virtual Unit Under Test—vUUT) which comprises the virtual compo-nents. Examples of such test objects are a motor vehicle, a powertrain, or also smaller systems such as a powerpack, a hybrid drive or also transmissions.

The test run is a time sequence of test object states which are regulated on the test bench by means of a controller or closed-loop control.

In the case of a powertrain test bench, the real test object is further connected to a load machine which specifies a load for the test object in accordance with the test procedure, for example a positive or negative load torque or rotational speed or a differently defined load condition. The real test object is operated under this load or load condition respectively pursuant to the test run specifications.

For example, a real internal combustion engine and transmission can be provided on the test bench, whereby the transmission is mechanically coupled to the load machine, preferably via the transmission output.

The combustion engine and the transmission are then actuated pursuant to a test run, for example by adjusting the throttle of the combustion engine, by specifying a gear, or by setting a specific rotational speed at the transmission output.

The load machine is controlled by a time-variable desired torque T or desired rotational speed n, the specification of which leads to a test object load or load condition respectively.

The progression of the desired torque or the desired rotational speed thereby depends on the operating points specified to be tested in the test run. In addition, the virtual test object, thus the virtual components of the powertrain such as, for example, shaft, differential, axle, tire, and the interaction with the environment of the test object, e.g. the contact between the tires and road, can be simulated by means of simulation models when specifying said desired torque T or said desired rotational speed n.

Time-varying parameters, particularly rotational speeds or torques, are passed at the interfaces between the real components and the virtual components in real time.

The depicting of dynamic systems and processes on a test bench encompassing virtual components and real components of a powertrain test object is a particular challenge.

Document WO 2011/022746 A1 relates to control of a test stand arrangement containing a test object, for example an internal combustion engine or a vehicle powertrain, which has at least one angle of rotation as the output and is connected to at least one load unit by at least one connecting shaft. In an impedance model describing the mechanical resistance for the test object, a desired value of the torque of the connecting shaft is calculated as an output value and this desired torque value used as the basis for the load unit torque control using the input variables derived from the test object.

Document AT 514725 B1 relates to a method for determining the propulsion torque of a torque generator assembled on a test bench, wherein an internal torque of the torque generator is measured and, based on the measured internal torque, a correction torque estimated from an equation of motion including the measured internal torque, a dynamic torque and a shaft torque measured on an output shaft of the torque generator, and the propulsion torque calculated from the estimated correction torque and the measured internal torque based on the $M_V = M_{COR} + M_I$ relation.

It is a task of the invention to provide an improved method and an improved system for controlling a test bench comprising real transmissions as part of the real test object. It is in particular a task of the invention to provide a method for controlling a test bench having a real transmission as part of the real test object in which the test object comprises a flexible shaft, particularly at the transmission output, as part of the virtual test object; i.e. a virtual subcomponent of the test object. Unlike a model of a "rigid shaft," a model of a "flexible shaft" factors in the individual parts of a shaft and their elasticities, attenuations and downstream masses which, together with the rUUT, form an oscillatory system.

This task is solved by a method for controlling and/or regulating a test bench for a powertrain in accordance with claim 1 and a system for controlling and/or regulating a test bench for a powertrain in accordance with claim 16. Advantageous embodiments are claimed in the subclaims. The teaching of the subclaims is expressly made part of the description.

A first aspect of the invention relates to a method for controlling, particularly in a closed-loop manner, a test bench for a powertrain with a real transmission, which comprises the following method steps:

calculating a desired value of a control parameter, in particular a desired rotational speed, of the transmission output of the real transmission on the basis of or respectively by means of a model, in particular a virtual test object, which represents the transmission or parts of the transmission (e.g. its inertia and/or the rotational inertia of the transmission condensed on the output shaft) and at least one further component, particularly a shaft, of the output side of the powertrain, in particular the shafts, differentials, wheels, tires, as virtual components, particularly of the virtual test object, on the basis of at least one measurement parameter measured on the powertrain, particularly a rotational speed and/or a torque; and controlling the test bench, in particular a load machine, on the basis of the desired value (particularly the desired rotational speed).

A second aspect of the invention relates to a system for controlling, particularly in a closed-loop manner, a test bench for a powertrain with a real transmission, wherein the system preferably comprises:

a first module for calculating a desired value of a control parameter, in particular a desired rotational speed, at the transmission output of the real transmission on the basis of or respectively by means of a model which represents the transmission and at least one further component, particularly a shaft of the output side of the powertrain, as virtual compo-nents on the basis of at least one measurement parameter measured on the powertrain, in particular at least one rotational speed and/or torque; and a second module for controlling the test bench, in particular an output machine, on the basis of the desired value (particularly the desired rotational speed).

A transmission in the sense of the invention comprises components suitable for reducing or respectively translating torque and rotational speed. In particular, a transmission is engageable by gear ratios or is a continuously variable ratio.

A transmission input is any connection of the transmission which is connected to a drive unit when installed in a vehicle as intended. Preferably, a transmission can comprise multiple transmission inputs so as to, for example, couple multiple drive units to an output of a hybrid vehicle.

A transmission output in the sense of the invention is any connection of a transmission which is connected to the part of the powertrain running to the wheels, the rest of the powertrain, when installed as intended.

Preferably, both the transmission input as well as the transmission output have a flange connectable to a drive or output side shaft.

A powertrain in the sense of the invention comprises those components configured to contribute to the drive of a vehicle, particularly the engine, transmission, shafts, differentials, wheels, tires, etc.

A powertrain in the sense of the invention, which is a test object on a test bench, comprises at least one real transmission. Preferably, other components of the powertrain are simulated as virtual components. Further preferably, such a powertrain comprises a plurality of real components and a plurality of virtual components. The real components are assembled on the test bench as actual structural components. The virtual components are stored as simulation models, in particular in real time, and simulated so as to supplementarily complete the real components into a powertrain.

A desired value in the sense of the invention is a setpoint or a setpoint sequence. Preferably, a desired valve comprises values, further preferably comprises engine characteristics and/or functions.

An axial moment of inertia is the axial inertia of rotating parts of the real transmission in relation to a rotational axis of the transmission output shaft. Preferably, it is defined by the axial inertia in the transmission's first gear and is a preferably time-invariant parameter. It preferably also comprises the inertia of those bodies coupled to the rotational movement of the transmission output shaft via kinematic constraints and in this case constitutes a so-called extended moment of inertia.

Stabilization in the sense of the invention is an improving of the quality of measured parameters by drawing on the values of other measurement parameters. A so-called sensor fusion method can in particular be used for stabilization. Measurement noise in particular can be reduced or even eliminated by stabilization. For example, an objective function of a measurement parameter may include weighting factors able to be calculated e.g. by a Kalman filter.

A module in the sense of the present invention can be designed based on hardware and/or software, preferably a processing unit, in particular a microprocessor unit (CPU), preferably data/signal-connected, in particular digitally, to a storage and/or bus system and/or comprise one or more programs or program modules. The microprocessor unit can thereby be designed to process commands implemented as a program stored in a storage system, record input signals from a data bus and/or emit output signals to a data bus. A storage system can comprise one or more, in particular different, storage media, in particular optical, magnetic, solid-state and/or other non-volatile media. The program can be provided such that it embodies or is respectively capable of executing the procedures described herein so as to enable the microprocessor to execute the steps of such procedures and thus in particular be able to control and/or regulate a test bench.

In controlling the test bench having a powertrain with a real transmission as the test object, the invention is based on the approach of factoring said transmission or at least its moment of inertia respectively into a simulation of the remaining powertrain components which are not assembled on the test bench in reality but only exist as virtual components. The transmission is thus not only part of the real test object but also the virtual test object. The real test object and the virtual test object are in this way not disjunctive/complementary relative each other but rather overlap in terms of at least some elements of the transmission, in particular the transmission inertia.

One advantage of factoring the transmission into the virtual test object is that the transmission's moment of inertia is taken into account in the simulation of the rest of the powertrain components which are not part of the real test object. In the case of a transmission test bench, for example, the components of the rest of the powertrain are thus for example the shaft, the differential, the axle and the wheels and tires, etc. Factoring in the transmission with its relatively high axial moment of inertia as part of the virtual test object can also prevent the rest of the powertrain from being set into oscillation due to its relatively low inertia in a dynamic simulation, which would make it impossible or at least much more difficult to control the load provided by a load machine. In particular, the invention enables a so-called flexible shaft to be provided as a virtual component in the model used for the simulation and still have the test bench operate stably since the propulsion torque calculated on the basis of the state of the real com-ponent acts on a body of high mechanical inertia, namely the transmission output.

In one advantageous embodiment of the invention, the model factors in properties of a vehicle, in particular a vehicle mass and/or inertia, and/or elasticities of the transmission output shaft(s) as well as properties of the track surface, in particular friction and/or rolling resistance coefficients. Factoring in the properties of the vehicle and further environmental properties as applicable enables the behavior of a powertrain in real operation to be depicted even more realistically on the test bench.

In a further advantageous embodiment, the model factors in at least one input torque of the real transmission, which in particular depends on the at least one measurement parameter, as a particularly time-invariant input parameter.

This input torque in the sense of the invention is a internal transmission torque and represents the applied torque in the transmission. Preferably, this factors in the transmission's axial moment of inertia. Factoring this input torque into the model/simulation enables adding the transmission, in particular its moment of inertia, to the virtual test object as a further virtual component, meaning the transmission is also one of the virtual components of the rest of the powertrain. Particularly the relatively low moment of inertia of the rest of the powertrain thereby increases and it becomes less susceptible to self-oscillation in the simulation, particularly when a flexible shaft is provided as the shaft. Providing the input torque of the real transmission into the model as an input parameter is further advantageous since a multitude of preexisting virtual vehicle models have an interface in order to factor in an input parameter such as the input torque as per the invention. Therefore, the respective structure of existing virtual vehicle models does not need to be changed to take the input torque into account.

According to the invention, noisy measured values are input in real time preferably on the basis of the sensor system installed on the real test object. Higher-quality time-varying physical parameters are determined in real time from said noisy measured values by suitable numeric methods, in particular the transmission output speed and the torque at the transmission output, preferably also the rotational speed at the transmission input and the torque at the transmission input. The input torque is in turn determined from these variables by a torque estimator.

In a further advantageous embodiment, the method according to the invention further comprises the method step:
calculating an input torque, particularly in real time, on the basis of the real transmission's axial moment of inertia, an angular acceleration of the transmission output of the real transmission determined by measurement, in particular with downstream real-time algorithms, and a measured torque of the real transmission's transmission output.

Accordingly, in one advantageous embodiment, the system comprises a third module for calculating an input torque of the transmission, particularly in real time, based on the real transmission's axial moment of inertia, an angular acceleration of the transmission output of the real transmission determined by measurement, and a measured torque of the real transmission's transmission output.

In a further advantageous embodiment of the invention, an in particular dynamic torque calculated from the angular acceleration of the transmission output and the axial moment of inertia of the transmission is added to the torque of the transmission output as measured and preferably correspondingly processed in real time. The input torque at the transmission input is thus determined from the relatively easy to measure or respectively determine parameters of the angular acceleration and applied torque at the transmission output. In particular, the transmission can thereby also be factored into existing test benches as a virtual component of the virtual test object.

In a further advantageous embodiment of the invention, a respective gear ratio of the transmission to be tested is taken into account when calculating the input torque and/or the desired value (in particular the desired rotational speed). In one variant of the invention, the axial moment of inertia is factored in as a function of a respectively existing gear ratio of the transmission to be tested. Particularly differences which result in different gear ratios at the transmission's axial moment of inertia can thereby be factored in. Model accuracy can in this way be increased.

In a further advantageous embodiment of the invention, the torque of the transmission output and/or a rotational speed of the transmission output is/are measured on the test bench. The angular acceleration of the transmission output can in particular be determined from the rotational speed of the transmission output.

In a further advantageous embodiment of the invention, the torque at the transmission output and/or the angular acceleration of the transmission output is/are filtered in each case by a filter, wherein the filter is preferably selected from among the following filters: second-order low-pass filter, Bessel filter, Butterworth filter, notch filter, Kalman filter. Filtering the signals can reduce or even eliminate noise.

In a further advantageous embodiment of the invention, a rotational speed of the transmission output is calculated and/or stabilized by means of further measured values, for example a rotational speed of the transmission input.

In a further advantageous embodiment of the invention, the inventive method further comprises the following method steps:
calculating the angular acceleration of the transmission output from the measured, preferably stabilized, rotational speed of the transmission output; and/or
measuring the angular acceleration or respectively importing the angular acceleration via suitable sensors.

Angular acceleration can be measured for example using the Ferraris principle. If the angular acceleration is both measured as well as calculated, Kalman filters can be applied to further reduce or respectively eliminate signal noise. The angular acceleration at the transmission output of the actual transmission can in this way be calculated in real time on a conventional test bench using commonly available measuring technology and known prior art real-time algorithms. Preferably, this angular acceleration is used as an input parameter during the calculation of the input torque.

Accordingly, in one advantageous embodiment, the system comprises:
a fourth module for calculating the angular acceleration of the transmission output from the measured, preferably stabilized, rotational speed of the transmission output; and/or
a fifth module for measuring the angular acceleration via suitable sensors.

In a further advantageous embodiment of the invention, the inventive method further comprises the following method step:
calculating or stabilizing the torque of the transmission output by means of a transmission input torque.

This also enables eliminating any noise from a measurement of the torque at the transmission output by the measurement of the torque applied at the transmission input.

Accordingly, in one advantageous embodiment, the system comprises:
a sixth module for calculating or stabilizing the torque of the transmission output by means of a transmission input torque.

In a further advantageous embodiment of the invention, the torque of the transmission output is determined by means of measuring an electrical air-gap torque of a test bench load machine. In this case, no further sensor for measuring torque needs to be provided at the transmission output.

The features and advantages described in the foregoing with respect to the method of the first aspect of the invention also apply analogously to the system of the second aspect of the invention and vice versa.

In one advantageous embodiment, the inventive system comprises a first sensor for determining or respectively measuring the angular acceleration of the transmission output, in particular by means of at least one measurement parameter; and a second sensor for measuring the torque of the transmission output.

Further features and advantages of the invention yield from the following description based on the figures. The figures show at least in part schematically:

FIG. 1 an embodiment of the inventive system installed on a test bench; and

FIG. 2 a flow chart of an example embodiment of the inventive method.

The inventive teaching will be described in detail on the basis of FIG. 1 which depicts an exemplary embodiment of the inventive system 20 on a transmission test bench 1 to be controlled.

A real transmission 2 is mounted on the transmission test bench 1 which, as a real component of a powertrain representing the test object, is subjected to a test operation. For this task, the test bench comprises a drive unit 7, preferably an electric motor, and a load machine 6 which is preferably also designed as an electric motor.

The drive unit 7 provides a torque $T_1$ at the transmission input 5. The load machine 6 exerts a load on the transmission output 4 via a test bench shaft 8. An output which the load machine must take up as load is defined by a rotational speed n to be set at the transmission output 4, the power supplied by the drive unit 7 and the gear ratio dictated by the transmission 3.

The inventive system 20 for controlling the test bench preferably comprises three modules.

A first module 21 of the system 20 for controlling the test bench 1 is configured to calculate a desired rotational speed n at the transmission output 4 of the real transmission 3 mounted on the test bench 1. To that end, a preferably realtime-capable model 2 is stored in a data processing system, in particular a data storage, of the first module 21 which is able to simulate a virtual transmission 3', a flexible shaft 15, a differential 16 as well as a vehicle axle 10a, 10b including wheels 9a, 9b as virtual components of the test object. Preferably, the simulated rest of the powertrain can also comprise fewer or additional virtual components. For example, the model can also factor in a differential 12 as a virtual component in addition to the flexible shaft 11.

To calculate a desired rotational speed n to be set at the transmission output 4 on the test bench 1, information is entered into the model 2 on the operating status of the test bench 1 as determined by the measuring of a measurement parameter in relation to the powertrain 2, in particular at least one rotational speed $n_1$, $n_2$ and/or torque $T_1$, $T_2$, preferably two measurement parameters: a rotational speed $n_2$ of the transmission output 4 of the real transmission 3 and a torque $T_2$ of the transmission output 4 of the real transmission 3.

From these two measurement parameters, a third module 23 of the system 20 calculates an input torque or an internal transmission torque $T_{in}$ of the transmission 3 or virtual transmission 3' respectively, in particular in real time.

This input torque $T_{in}$ is entered into the model 2 as an input parameter, on the basis of which the first module 21 calculates the desired rotational speed n. Preferably, the input parameter $T_{in}$ is thereby time-invariant, meaning it always assumes the same value given the same configuration of respective measurement parameter values.

The third module 23 thereby preferably determines the input torque $T_{in}$ according to the following relationship:

$$T_{in} = T_2 + J_y \cdot \alpha(t) \qquad \text{Equation (1)}$$

Equation (1) is in the form of a Euler differential equation solved numerically as per the invention, wherein $\alpha(t)$ is the angular acceleration of the transmission output 4, $J_y$ is the axial moment of inertia of the real transmission, $T_2$ is the axial torque of the test bench shaft 8.

The angular acceleration $\alpha(t)$ of the transmission output 4 can be determined by deriving the rotational speed $n_2$ of the test bench shaft 8 which is connected to rotate with the transmission output 4 and the load machine 6.

To that end, the system 1 preferably comprises a first sensor 24, for example an incremental encoder, configured to detect a rotation of the rotor of the load machine 6 and/or the test bench shaft 8. Alternatively, the load machine 6 can also have its own speed sensor which provides the rotational speed $n_2$ to the third module 23 of the system 1. The rotational speed $n_2$ can thereby be determined for example on the basis of the alternating electromagnetic field generated by the load machine 6.

The following equation thereby yields the angular velocity $\alpha(t)$ by numerical differentiation of the rotational speed $n_2$ at the transmission output 4:

$$\alpha(t) = \frac{n_2(t + \Delta t) - n_2(t)}{\Delta t} \qquad \text{Equation (2)}$$

In order to improve the quality of the measurement signal here, e.g. a signal of the incremental encoder, different filterings can be applied to the signal in order to improve its quality. Particularly suited to this purpose are second-order low-pass filters, Bessel filters, Butterworth filters or also notch filters. Kalman filters can also be used.

Additionally or alternatively, a rotational speed $n_1$ can also be measured at the transmission input 5. From this rotational speed $n_1$, preferably the rotational speed at the transmission output 4 can be deduced via the gear ratio of the transmission 3. The rotational speed $n_1$ can be measured by means of a separate speed sensor 26, in particular on the load machine 6, which is connected to rotate with the transmission input 5 of the transmission 3. The sensor 26 can thereby be a component of the drive unit 7 or even an additional sensor of the inventive system 20 arranged on the load machine 7 or between the load machine 7 and the transmission input 5 in order to measure the rotational speed $n_1$.

Upon both rotational speed $n_1$ at transmission input 5 and rotational speed $n_2$ at transmission output 4, sensor fusion or information fusion methods can then be used in order to link the data relating to $n_1$ and $n_2$, potentially using the gear ratio i of the transmission if applicable, in order to improve the quality of the rotational speed signal at the transmission output 4 which is material to determining the input torque $T_{in}$. In sensor fusion/information fusion, measurement signals are applicably combined so as to generate a more accurate representation of reality.

Additionally possible is directly measuring the angular acceleration $\alpha(t)$, for example using the Ferraris principle. Given this directly measured angular acceleration $\alpha(t)$ and for example rotational speed $n_2$ at the transmission output 4, as determined for example on the load machine 6, sensor fusion/information fusion methods can then also be employed here, likewise in order to improve the angular acceleration α (t) signal quality.

The axial moment of inertia $J_y$ of transmission 3, 3' preferably results from the following equation:

$$J_y = J_5 \cdot i_{1stgear} + J_4 \qquad \text{Equation (3)}$$

$J_5$ is thereby the measured moment of inertia at transmission input 5 and $J_4$ the measured moment of inertia of the transmission 3 at transmission output 4, each in first gear, having gear ratio $i_{1stgear}$. Preferably approximated values can be used per the invention for the $J_4$, $J_5$ moments of inertia and the $i_{1stgear}$ gear ratio.

The axial moment of inertia $J_y$ of the transmission 3, 3' in first gear can thus preferably also be adopted for all the other gear ratios; i.e. assumed in approximation as a constant.

The value for the axial moment of inertia $J_y$, which is used in the third module 23, should preferably be the same as used in the first module 21 to calculate the desired rotational speed n. That means that the value used to determine the input torque $T_{in}$ is to preferably be identical to the value for the axial moment of inertia $J_y$ used in inventive model 2 to calculate the desired rotational speed n.

The torque $T_2$ at the transmission output 4 from equation (1) can preferably be measured by means of a torque sensor 25 on the test bench shaft 8. This measured torque $T_2$ corresponds to the torque at the transmission output 4.

The quality of the signal acquired from the torque sensor 25 can also be improved using different signal filters.

Additionally, the torque $T_1$ at the transmission input 5 can be used to calculate the value of the torque $T_2$ at the transmission output 4, in particular utilizing gear ratio/transmission 3. It can alternatively be provided to stabilize the measurement signal of the torque $T_2$ at the transmission output 4 by means of the torque $T_1$ at the transmission input 5, in particular also by utilizing sensor fusion/information fusion methods.

Alternatively or additionally, measurement of an air-gap torque of the load machine 6 can also be used to calculate and/or stabilize the torque $T_2$ at the transmission output 4.

The input torque $T_{in}$ calculated in the third module 23 is fed into the model 2 for calculating a rotational speed n at the transmission output 4, 4'. The input torque $T_{in}$ thereby in particular serves to factor the axial moment of inertia $J_y$ of the transmission 3, 3' into the simulation of the rest of the powertrain's behavior.

Preferably, the calculated rotational speed n is output to a second module 22 of the system 1 for controlling the test bench, in particular for controlling the load machine 6. The second module 22 can thereby be both part of the inventive system 20 as well as part of a controller already on the test bench 1.

The principle described above with reference to FIG. 1 for controlling a test bench 1 is broken down into individual method steps based on FIG. 2.

In order to be able to calculate an input torque $T_{in}$ for simulation in the model, the angular acceleration α (t) is first calculated, 101a, preferably on the basis of a measured rotational speed $n_2$ of the transmission output 4. Alternatively or additionally, the angular acceleration α (t) is measured by suitable sensors, 101b. Additionally, a torque $T_2$ of the transmission output is measured or calculated or additionally stabilized via the torque $T_1$ of the transmission input 5, 101c.

In a next step, the input torque $T_{in}$ is calculated in real time, wherein the axial moment of inertia $J_y$ of the real transmission 3, the angular acceleration α (t) and the torque $T_2$ at the transmission output 4 of the real transmission 3 as calculated as described with reference to FIG. 1 are taken as the input parameter.

The desired rotational speed n at the transmission output 4 is calculated in the model 2 using the input torque $T_{in}$ as well as further properties of the rest of the powertrain, preferably consisting of the shaft 11, differential 12, axle 10a, 10b and the wheels 9a, 9b, 102. The test bench 1, in particular its load machine 6, is controlled on the basis of said desired rotational speed n, 103.

The described control process enables a control loop of a test bench 1 for a powertrain having a real transmission 3 and a virtual flexible shaft 11 which ensures stable operation of the test bench 1 at a rotational speed n to be set at the transmission output 4.

The exemplary embodiments described in the foregoing are merely examples which in no way limit the protective scope, application or design of the invention. Rather, the preceding description affords one skilled in the art a guideline for the implementation of at least one embodiment, whereby various modifications can be made, in particular with regard to the function and configuration of the described components, without departing from the protective scope ensuing from the claims and equivalent feature combinations.

LIST OF REFERENCE NUMERALS 1 test bench
2 powertrain
3 transmission
4 transmission output
5 transmission input
6 load machine
7 drive unit
8 test bench shaft
9a, 9b wheel
10a, 10b axle section
11 shaft
12 differential
20 system
21 first module
22 second module
23 third module
24 first sensor
25 second sensor
26 third sensor
27 fourth sensor
$T_{in}$ input torque
$T_1$ torque of transmission input
$T_2$ torque of transmission output
$n_1$ rotational speed of transmission input
$n_2$ rotational speed of transmission output
α(t) angular acceleration
$J_y$ axial moment of inertia
$J_4$ moment of inertia at transmission output
$J_5$ moment of inertia at transmission input

What is claimed is:

1. A method for controlling a test bench for a powertrain having a transmission, comprising the following method steps:
    operating the transmission on the test bench as a real component;
    calculating a desired value of a control parameter of a transmission output of the transmission on a basis of a model that simulates the transmission and at least one component of an output side of the powertrain other than the transmission as virtual components, wherein the at least one component of the output side of the powertrain is not assembled on the test bench in reality but only exists as one of the virtual components and the transmission is both assembled on the test bench in reality and simulated as one of the virtual components, on a basis of at least one measurement parameter measured on the powertrain; and controlling the test bench on a basis of the desired value of the control parameter.

2. The method according to claim 1, wherein the model factors in properties of a vehicle and properties of a track surface.

3. The method according to claim 1, wherein the model factors in at least one input torque of the transmission.

4. The method according to claim 1, further comprising the following method step:

calculating an input torque of the transmission on a basis of an axial moment of inertia of the transmission, an angular acceleration of the transmission output of the transmission, and a measured torque of the transmission output of the transmission.

5. The method according to claim 4, wherein a dynamic torque calculated from the angular acceleration of the transmission output of the transmission and the axial moment of inertia of the transmission is added to the measured torque of the transmission output of the transmission.

6. The method according to claim 4, wherein a respective gear ratio of the transmission to be tested is taken into account when calculating the input torque of the transmission and/or the desired value of the control parameter.

7. The method according to claim 4, wherein the axial moment of inertia of the transmission is factored in as a function of an existing gear ratio of the transmission to be tested.

8. The method according to claim 4, wherein the measured torque of the transmission output of the transmission and/or a rotational speed of the transmission output of the transmission is measured on the test bench.

9. The method according to claim 8, wherein the measured torque of the transmission output of the transmission and/or the angular acceleration of the transmission output of the transmission is filtered by a filter, wherein the filter is selected from the group consisting of: a second-order low-pass filter, a Bessel filter, a Butterworth filter, a notch filter, or a Kalman filter.

10. The method according to claim 8, wherein the rotational speed of the transmission output of the transmission is calculated or stabilized by further measured values.

11. The method according to claim 4, further comprising at least one of the following method steps:

calculating the angular acceleration of the transmission output of the transmission from a measured rotational speed of the transmission output of the transmission; and/or measuring the angular acceleration of the transmission output of the transmission.

12. The method according to claim 4, further comprising the following method step:

calculating or stabilizing the measured torque of the transmission output of the transmission by means of a torque of a transmission input.

13. The method according to claim 4, wherein the measured torque of the transmission output of the transmission is determined by measuring an electrical air-gap torque of a load machine of the test bench.

14. A non-transitory computer-readable medium having instructions stored thereon, that when executed, cause to be performed the following steps:

operating a transmission as a real component on a test bench for a powertrain;

calculating a desired value of a control parameter of a transmission output of the transmission on a basis of a model that simulates the transmission and at least one component of an output side of the powertrain other than the transmission as virtual components, wherein the at least one component of the output side of the powertrain is not assembled on the test bench in reality but only exists as one of the virtual components and the transmission is both assembled on the test bench in reality and simulated as one of the virtual components, on a basis of at least one measurement parameter measured on the powertrain; and controlling the test bench on a basis of the desired value of the control parameter.

15. A system for controlling a test bench for a powertrain with a transmission, the system comprising:

a first module for operating the transmission as a real component;

a second module for calculating a desired value of a control parameter of a transmission output of the transmission on a basis of a model that simulates the transmission and at least one component of an output side of the powertrain other than the transmission as virtual components, wherein the at least one component of the output side of the powertrain is not assembled on the test bench in reality but only exists as one of the virtual components and the transmission is both assembled on the test bench in reality simulated as one of the virtual components, on a basis of at least one measurement parameter measured on the powertrain; and a third module for controlling the test bench on a basis of the desired value of the control parameter.

16. The system according to claim 15, further comprising:

a fourth module for calculating an input torque of the transmission based on an axial moment of inertia of the transmission, an angular acceleration of the transmission output of the transmission, and a measured torque of the transmission output of the transmission.

17. The system according to claim 16, further comprising:

a first sensor for determining the angular acceleration of the transmission output of the transmission; and a second sensor for measuring the torque of the transmission output of the transmission.

* * * * *